US011984275B2

(12) United States Patent
Gengenbach et al.

(10) Patent No.: US 11,984,275 B2
(45) Date of Patent: May 14, 2024

(54) ELECTRICAL MAINS PLUG (71) Applicant: TMC SENSORTECHNIK GMBH, Bretten (DE)

(72) Inventors: Bruno Gengenbach, Pforzheim (DE); Michael Bucher, Pforzheim (DE)

(73) Assignee: TMC SENSORTECHNIK GMBH, Bretten (DE)

( * ) Notice: Subject to any disclaimer, the term of this patent is extended or adjusted under 35 U.S.C. 154(b) by 0 days.

(21) Appl. No.: 16/753,752

(22) PCT Filed: Oct. 2, 2018

(86) PCT No.: PCT/EP2018/076824
§ 371 (c)(1),
(2) Date: Apr. 3, 2020

(87) PCT Pub. No.: WO2019/068725
PCT Pub. Date: Apr. 11, 2019

(65) Prior Publication Data
US 2020/0279706 A1 Sep. 3, 2020

(30) Foreign Application Priority Data
Oct. 4, 2017 (DE) .................... 20 2017 106 035.7

(51) Int. Cl.
*H01H 37/64* (2006.01)
*H01H 37/00* (2006.01)
(Continued)

(52) U.S. Cl.
CPC .......... *H01H 37/64* (2013.01); *H01H 37/002* (2013.01); *H01H 37/006* (2013.01);
(Continued)

(58) Field of Classification Search
CPC .... H01H 37/64; H01H 37/002; H01H 37/006; H01H 37/043; H01H 37/54; H01H 2037/046; H01H 2037/526
(Continued)

(56) References Cited

U.S. PATENT DOCUMENTS 3,225,162 A 12/1965 Delafrange
4,903,162 A * 2/1990 Kopelman ......... H01R 13/7137
361/103
(Continued)

FOREIGN PATENT DOCUMENTS

CN 201163690 12/2008
CN 101976633 2/2011
(Continued)

*Primary Examiner* — Anatoly Vortman
(74) *Attorney, Agent, or Firm* — Orbit IP (57) ABSTRACT An electrical mains plug having a body formed of an electrically insulating material is described. Two contact pins are arranged parallel to one another and which project out of the body at a first side thereof, and inside the body are connected or can be connected in each case to an electrical conductor which leads out or can be led out of the body at a second side thereof. The thermal bimetallic element is provided as a temperature sensor, said thermal bimetallic element being a constituent part of the thermal bimetallic switch which is associated with at least one of two contact pins. An electrical connection cable suitable therefor and an electrical device connected thereto are also described.

22 Claims, 6 Drawing Sheets

(51) Int. Cl.
*H01H 37/04* (2006.01)
*H01H 37/54* (2006.01)
*H01H 37/52* (2006.01)

(52) U.S. Cl.
CPC .......... *H01H 37/043* (2013.01); *H01H 37/54* (2013.01); *H01H 2037/046* (2013.01); *H01H 2037/526* (2013.01)

(58) Field of Classification Search
USPC ....................................................... 337/365
See application file for complete search history.

(56) References Cited

U.S. PATENT DOCUMENTS

| | | | | |
|---|---|---|---|---|
| 5,590,010 | A * | 12/1996 | Ceola | H01R 13/7137 337/13 |
| 5,627,719 | A * | 5/1997 | Gaston | H01B 7/324 361/103 |
| 5,742,464 | A * | 4/1998 | Ceola | H01R 13/7137 361/103 |
| 6,204,747 | B1 * | 3/2001 | Kitchens | H01H 37/761 337/407 |
| 6,340,926 | B1 * | 1/2002 | Chu | H01H 83/04 337/407 |
| 6,802,741 | B1 * | 10/2004 | Shatkin | H01R 13/7137 200/51 R |
| 7,489,227 | B2 * | 2/2009 | Fabian | H01R 13/7137 337/113 |
| 8,956,168 | B2 * | 2/2015 | Al-Anzi | H01R 13/635 439/159 |
| 9,490,640 | B2 | 11/2016 | Pham | |
| 9,627,821 | B1 * | 4/2017 | I | H01R 13/688 |
| 9,919,609 | B2 | 3/2018 | Kretschmer | |
| 10,259,331 | B2 | 4/2019 | Sauer | |
| 10,468,833 | B1 * | 11/2019 | Fusselman | H01R 13/652 |
| 10,530,101 | B2 | 1/2020 | Rose | |
| 2007/0252671 | A1 | 11/2007 | Bischoff | |
| 2009/0190281 | A1 | 6/2009 | Vaatainen | |
| 2013/0134933 | A1 | 5/2013 | Drew | |
| 2014/0073189 | A1 | 3/2014 | Kondou | |
| 2015/0171567 | A1 | 6/2015 | Kawamoto | |
| 2017/0077656 | A1 | 3/2017 | Biedeman | |

FOREIGN PATENT DOCUMENTS

| | | | |
|---|---|---|---|
| DE | 102004036117 | 3/2006 | |
| DE | 102008031389 | 10/2009 | |
| DE | 102014118076 | 6/2015 | |
| DE | 102014111334 | 2/2016 | |
| DE | 202015106844 | 4/2016 | |
| DE | 102015004313 | 10/2016 | |
| DE | 102015106251 | 10/2016 | |
| DE | 102015206840 | 10/2016 | |
| DE | 102015107053 | 11/2016 | |
| GB | 2308510 | 6/1997 | |
| GB | 2313718 | 12/1997 | |
| JP | 2009043509 A * | 2/2009 | ........ H01R 13/7137 |
| KR | 1020170079312 | 7/2017 | |
| RU | 2140692 C1 | 10/1999 | |

* cited by examiner

ELECTRICAL MAINS PLUG

CROSS-REFERENCE TO RELATED APPLICATIONS

This US National Phase application under Section 371 claims priority to PCT/EP2018/076824 filed on Oct. 2, 2018 which was published as WO 2019/068725 A1 and also the German application number 20 2017 106 035.7 filed on Oct. 4, 2017, the entire contents of which are fully incorporated herein with these references.

FIELD OF THE INVENTION

The invention relates to a mains plug with a body formed from an electrically insulating material, in which two contact pins are arranged parallel to each other, each of which projects out of the body at a first side thereof and inside of the body, is or can be connected to an electrical conductor, which leads out or can be led out of the body at a second side thereof, and in which a sensor is provided.

BACKGROUND OF THE INVENTION

Such a mains plug is known from the DE 10 2015 206 840 A1. The well-known mains plug belongs to a charging device for charging the accumulator of an electric or hybrid vehicle on an AC power supply. A charging cable connects the mains plug to a charging device. For the purpose of overheating protection, the mains plug contains a sensor consisting of the two contact pins, for example, made of iron, and consisting of four wires made of a metal other than iron, for example, made of a copper-nickel alloy. Each of these copper-nickel wires are soldered to two points of each contact pin, which are spaced away from each other in the longitudinal direction of the contact pin. At the spaced-away connection points, an electrical potential difference is formed due to the Seebeck effect, which depends on the temperature difference between the two connection points. In this way, it is possible to determine a measureable temperature gradient along each contact pin. However, manufacturing such a mains plug is complex; the mains plug burdens the copper-nickel wires with full mains voltage and does not allow measurement of the absolute temperature in the mains plug to be performed but merely provides an indication of if there is a temperature gradient or not. This does not allow reliable temperature monitoring, because an excessively high temperature can also be present even if there is an inconspicuous temperature gradient.

It may be one of many objects of the present invention to create a mains plug that allows for monitoring of the temperature of a contact pin of the mains plug to be performed and that is easier to assemble than a mains plug in accordance with DE 10 2015 206 840 A1.

SUMMARY OF THE INVENTION

According to the invention, the task is achieved by means of a mains plug with the features indicated in the disclosure. Another object of the invention is an electrical cable to which a mains plug according to the invention is attached. Another object of the invention is an electrical device which monitors the at least one thermal bimetallic switch provided in the mains plug and which limits or can limit the power consumption of the electrical device if a specified threshold temperature is exceeded. The electrical device can detect that the temperature threshold is exceeded when at least one thermal bimetallic switch reaches or exceeds its switching temperature and, as a result, its switch position changes from "open" to "closed" or from "closed" to "open".

The invention may have the following advantages:

The installation of a thermal bimetallic switch allows for reliable monitoring of a temperature in the mains plug to be performed, which is a measure of the temperature of a contact pin when, as provided, the thermal bimetallic switch is assigned to the contact pin.

Thermal bimetallic switches are available in such a small size, both in open design as well as in a closed design (a switchgear surrounded by a housing), that they can easily be accommodated in a commercially available mains plug. Suitable thermal bimetallic switches with a closed design are disclosed, for example, in DE 10 2008 031 389 B3 and in DE 10 2004 036 117 B4.

With the possible small dimensions of the thermal bimetallic switches, each contact pin can have its own thermal bimetallic switch associated with it. This can increase monitoring security.

In any case, a thermal bimetallic switch can be arranged in direct contact with the contact pin if it has an electrically non-conductive housing.

Current flowing over the contact pin is not applied to the thermal bimetallic switches.

Thermal bimetallic switches have a specified switching temperature, which is determined by the choice of material for the thermal bimetal and by the mechanical construction of the switch and can be adapted to the respective application.

Exceeding or falling below a specified temperature threshold can be simply determined by changing the switching position of the thermal bimetallic switch from "open" to "closed" or from "closed" to "open".

The switching position of the thermal bimetallic switch can be determined, for example, by applying an electrical test voltage on the connections of the thermal bimetallic switch, which results in a current flow via the thermal bimetallic switch when the switch is closed, which current flow can be easily measured. The electrical test voltage can, for example, come from an electrical device that is connected to the electrical mains via the mains plug.

By shaping the thermal bimetallic element into a snap disc, it can be ensured that the curvature of the thermal bimetallic element changes abruptly when the switching temperature is reached so that the switching temperature can be set within narrow limits.

The thermal bimetallic switch can have a contact spring made of copper or a copper alloy, which is actuated by a thermal bimetallic snap disc held on the contact spring. However, it is also possible to manufacture the contact spring itself from a thermal bimetallic element so that a separate thermal bimetallic element is not required for actuating the contact spring. This simplified embodiment of the thermal bimetallic switch is therefore possible, in particular, because the mains current does not flow over the contact spring of the thermal bimetallic switch.

Thermal bimetallic switches are inexpensive and have a long service life.

Thermal bimetallic switches can be prefabricated and inserted into a mount intended for them in the mains plug. Such a mount can be formed in the course of manufacturing of the mains plug, for example, when forming its housing or its internal structures, by injection-moulding without additional manufacturing effort.

With the mains plug according to the invention, not only overheating of the mains plug itself can be detected, but also overheating of a socket in which the mains plug is located. Sockets are more affected than mains plugs by the risk of overheating, in particular, due to corrosion of the socket contacts in the socket and thus increased contact transfer resistance, as well as due to a mechanical deformation of the socket contacts in the socket. The mains plug according to the invention is therefore also especially suitable for preventing overheating in a socket, thereby preventing consequential damage, for example, a fire.

If only one thermal bimetallic switch is provided in the mains plug, it can be arranged in such a way that it responds equally well to the temperature of both contact pins. For this purpose, the thermal bimetallic switch can be arranged parallel to the two contact pins of the mains plug in the middle between them. Alternatively, the thermal bimetallic switch can also be arranged transversely to the two contact pins. If the thermal bimetallic switch has an electrically insulating housing or an electrically insulating carrier, it can also come into contact with the two contact pins via this, which promotes the heat transfer from the contact pins to the thermal bimetallic switch. However, it is also possible to arrange the individual thermal bimetallic switch closer to one contact pin than to the other. This would lead to a faster response to an excessive temperature of the nearest contact pin.

In particular, two thermal bimetallic switches are provided in the mains plug, each of which lies next to one of the two contact pins. This may allow an optimal heat transfer from the contact pins to the thermal bimetallic switches, because both can be arranged next to the contact pins, in particular one directly next to the one contact pin and one next to the other contact pin. In addition, excessively high temperatures can be reliably detected on only one of the two contact pins. Monitoring reliability increases, as monitoring is also possible in the event of a failure of one thermal bimetallic switch.

If two thermal bimetallic switches are provided, they can both be arranged between the two contact pins of the mains plug, in particular in direct contact with the respective contact pin. However, it is also possible to arrange both bimetallic contact switches transversely to the contact pins, in particular in direct contact with the contact pins.

A separate mount can be formed for each thermal bimetallic switch in the mains plug. This is possible, in particular, if the mains plug has a housing consisting of two complementary parts manufactured by means of injection-moulding from synthetic material, which parts have a structure in order to hold the contact pins in place. This structure can already be formed with mounts for the thermal bimetallic switches without an additional working process by means of the injection-moulding process, into which the thermal bimetallic switches only need to be inserted in order to assume a predetermined position.

However, the invention is also suitable for mains plugs, whose internal components are over-moulded with the synthetic material of the body, thereby forming a single-piece body.

Mains plugs are known, in the bodies of which an electrically insulating cover is provided, under which points of the contact pins are located, at which points said contact pins are connected or can be connected to the electrical conductors leading out of the second side of the body. The cover shields these points, for example, against a synthetic material, which is used to form the body of the mains plug by over-moulding its internal components. The thermal bimetallic switch(es) is (are) arranged at least partially under the cover. If the access of the injection-moulding compound to the thermal bimetallic switches is prevented by the cover, open thermal bimetallic switches can even be used in such a mains plug. switches without a housing can respond faster to an elevated temperature as encapsulated switches.

A separate mount can be arranged under the cover for each thermal bimetallic switch. In particular, the cover itself is formed to comprise the mount. Since such a cover may be expediently manufactured by means of injection-moulding from synthetic material, the cover can be formed without additional effort by the appropriate shaping of its injection mould with suitable mounts for the thermal bimetallic switches, into which the thermal bimetallic switches only need to be inserted, such as being pushed in or plugged in.

In particular, the mounts for the thermal bimetallic switches project from the top side of the cover into the space under the cover; this is the space in which the rear ends of the contact pins are located, which are shielded by the cover.

For inserting the thermal bimetallic switches into their respective mounts, it is possible that the mounts protruding from the top side of the cover into the space below the cover are open at the top, i.e. at the top side of the cover. The thermal bimetallic switches can then be inserted into their respective mount optionally before or after the application of the cover to a carrier made of electrically insulating material that can be provided for the contact pins. Such a carrier and its possible advantages for a rational manufacturing of the mains plug are described below.

In particular, the mounts are open on their side facing the nearest contact pin to facilitate heat transfer from the contact pin to the thermal bimetallic switch. If thermal bimetallic switches are used that have a housing, then such housing may consist of a ceramic, e.g. an aluminium oxide ceramic, because it may conduct heat better than synthetic materials. If it is ensured that the housing does not come into contact with the nearest contact pin, it can also be made of metal, which may have the advantage of conducting heat well.

If two thermal bimetallic switches are provided in the mains plug, then these can be connected to a common circuit board on a mechanical and electrical level. The common circuit board and the two thermal bimetallic switches then form a module, which may facilitate the manufacturing of the mains plug according to the invention, because the module can be prefabricated, for example, by the manufacturer of the thermal bimetallic switches, so that it only needs to be plugged into the mounts provided for the thermal bimetallic switches by the manufacturer the mains plug. On the small circuit board, connection points for signal lines can be provided, through which the thermal bimetallic switches can be connected to an external monitoring device. The connection wires of the thermal bimetallic switches can, however, be inserted through holes in the circuit board, secured by soldering and later soldered to the signal lines.

If two thermal bimetallic switches are provided, then a total of two, three or four signal lines can be provided for them. Two signal lines are sufficient if the two thermal bimetallic switches are connected in series and closed below their switching temperature. With four signal lines, the two thermal bimetallic switches can be operated independently of each other and the two contact pins can be monitored independently of each other; but this is also possible with only three signal lines if one connection from each thermal bimetallic switch is connected to a common signal line.

The signal lines can be combined together with the electrical conductors that lead the mains current into a sheathed cable. Such cables are state of the art as are thermal bimetallic switches, which can be used in the mains plug according to the invention.

Figure 3:
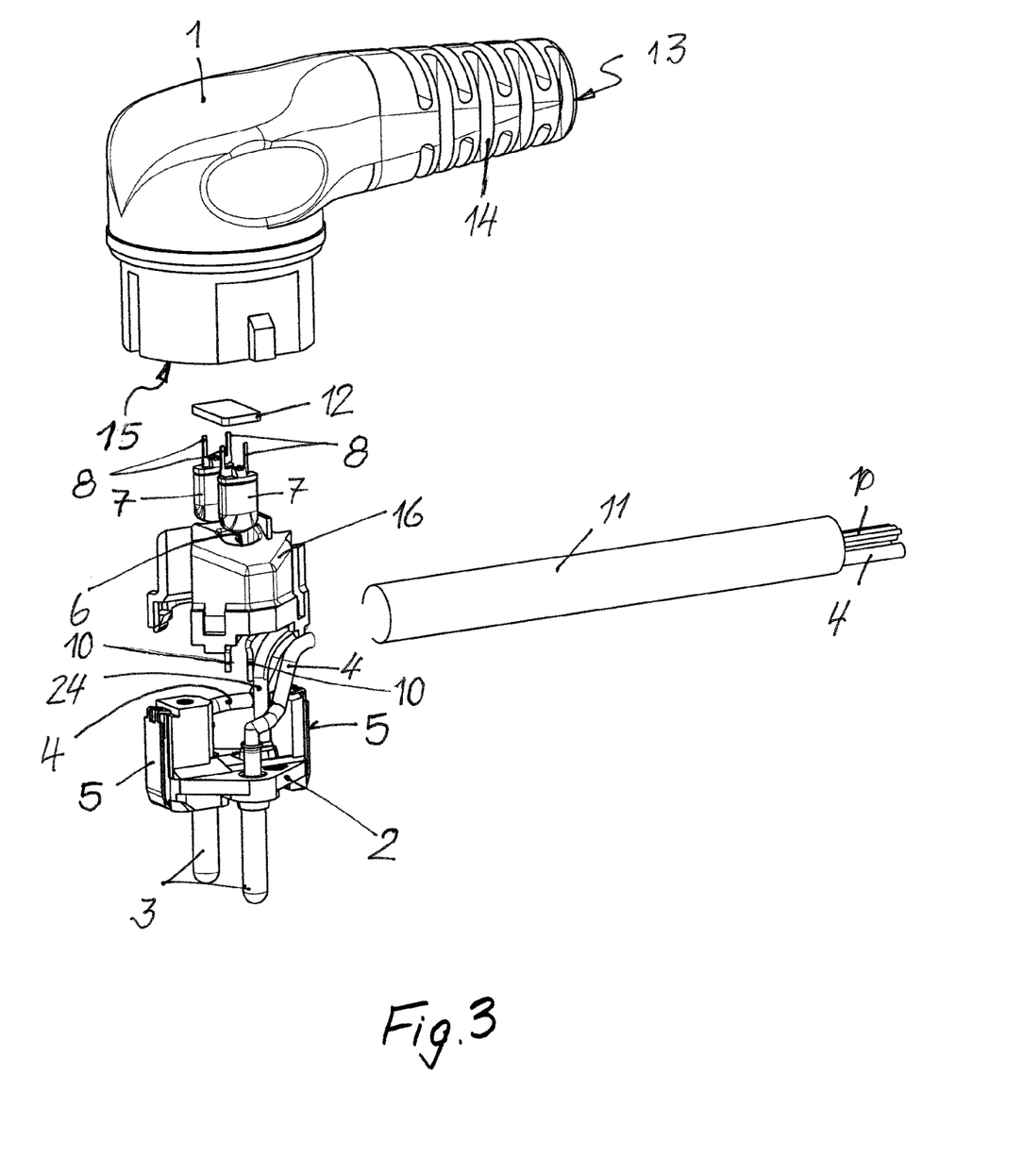
FIG. 3 shows a second exemplary embodiment of the mains plug according to the invention in an exploded view.
Figure 4:
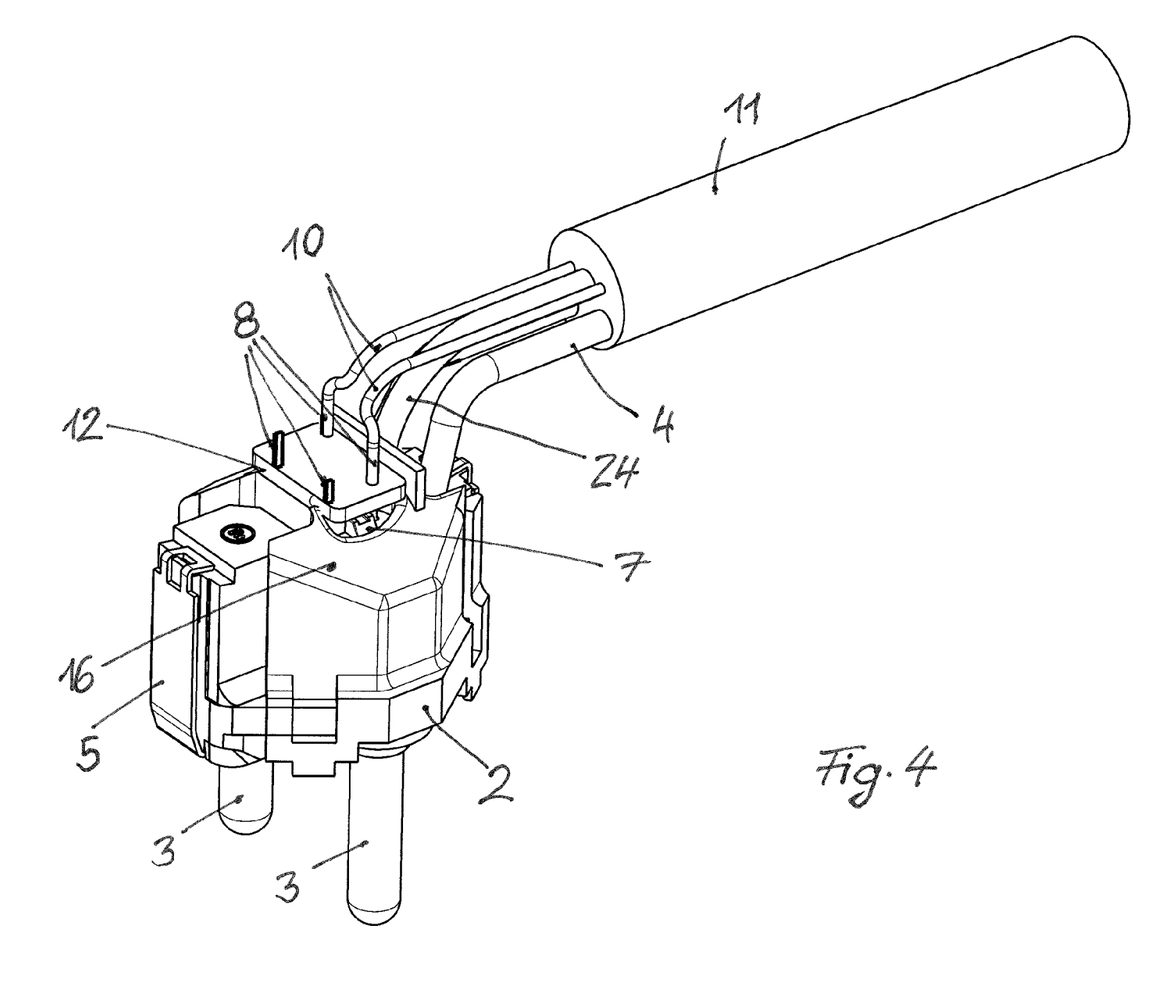
FIG. 4 shows the inner construction of the mains plug from FIG. 3 in a diagonal view.

In particular, in the case of mains plugs, whose body is formed as a single piece by injection-moulding from synthetic material, it is known to provide for the contact pins a separate carrier of electrically insulating material. Such a carrier is also referred to as a "bridge" by plug manufacturers. The carrier can be manufactured by means of injection-moulding. It is also known to attach a cover to such a carrier, in particular, to snap-mount it, under which cover the connections of the contact pins are located. This carrier and the cover attached to it may shield the underlying plug parts when injection-moulding the body of the plug. The carrier, the contact pins attached to it, the cable connected to it and the cover can be prefabricated as a module and be supplied to form the plug body by over-moulding the module with a synthetic material or for inserting into a prefabricated plug body. This module can also contain the thermal bimetallic switches and a connecting circuit board, to which the ends of the signal lines are attached. Mounts for the thermal bimetallic switches can be formed in this module either on the carrier or on the cover, which is attached on the carrier. By means of such a modularization, the mains plug according to the invention can be efficiently manufactured with one or two thermal bimetallic switches. Instead of attaching the ends of the signal line to a circuit board contacting the thermal bimetallic switches, they can also be attached directly to the electrical connections of the thermal bimetallic switches. This may have the advantage that the circuit board is not necessary. To make this possible, it may be advantageous if the thermal bimetallic switches, as shown in FIG. 3 and FIG. 4, have connection wires that project upwards from the cover.

An electrical connection cable to which a mains plug according to the invention is attached, can be connected via its conductors leading the mains current and with the signal conductors coming from the thermal bimetallic switches directly or by means of a device plug to an electrical device, which is to be supplied with power from the mains. Such a device can have an electrical monitoring device, which monitors whether the switching position of the thermal bimetallic switch(es) is (are) open or closed. For this purpose, a test voltage can be applied onto the signal lines in the electrical device, which test voltage leads to a current flow via the thermal bimetallic switch when the thermal bimetallic switch is closed but is interrupted when the thermal bimetallic switch is open. In this way, the monitoring device in the electrical device can detect the position of the thermal bimetallic switch and, if the detected switching position signifies that the switching temperature has been exceeded, the monitoring device can reduce or interrupt the power consumption of the device temporarily, thus preventing or counteracting overheating. In particular, in such a case, the mains current is not completely interrupted, but the power consumption of the device is reduced to a value at which the thermal bimetallic switch goes below its switching temperature instead of being completely interrupted For this purpose, the electrical device can contain a controller, which performs the appropriate power consumption regulation.

BRIEF DESCRIPTION OF THE DRAWINGS

Exemplary embodiments of the invention are represented in the enclosed drawings.

DETAILED DESCRIPTION OF THE PREFERRED EMBODIMENTS

Identical or corresponding parts are denoted in the exemplary embodiments with coinciding reference numbers.

Figure 1:
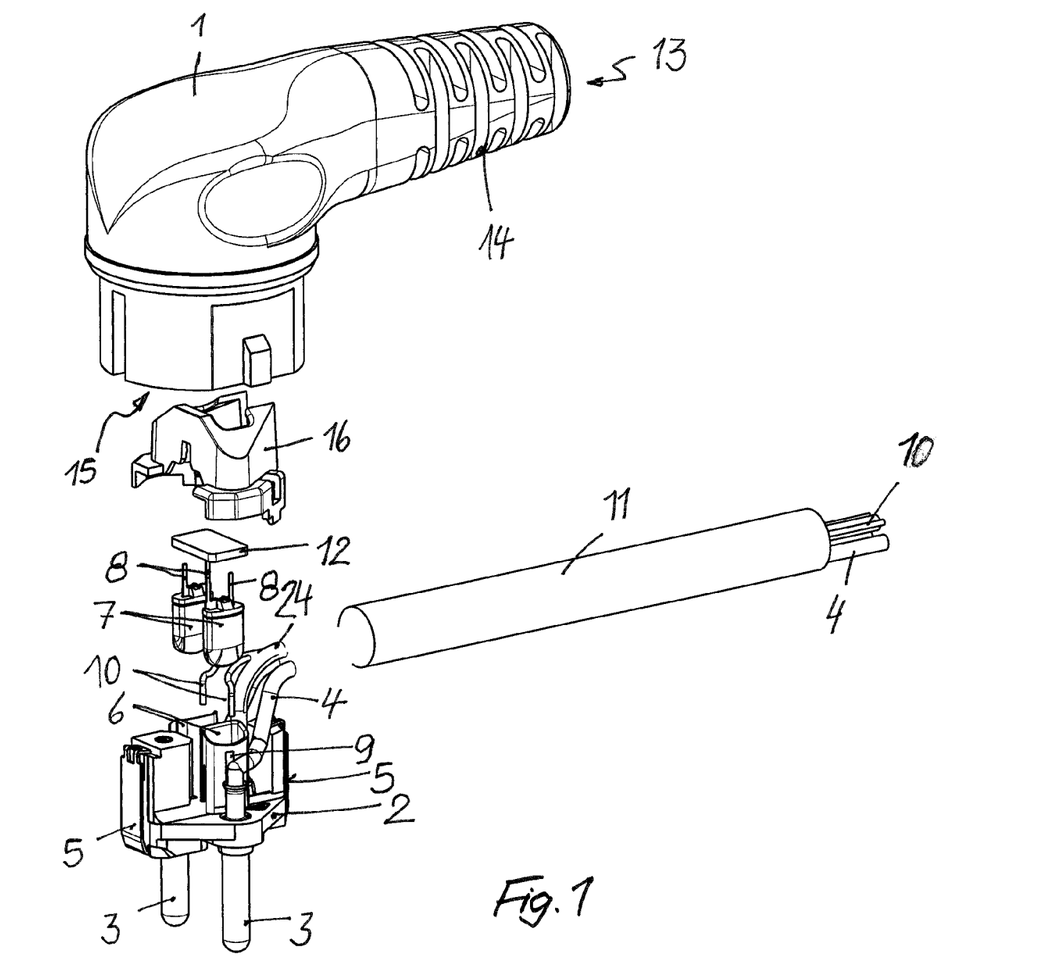
FIG. 1 shows a first exemplary embodiment of the mains plug according to the invention in an exploded view.

The mains plug shown in FIG. 1 is the "two-pin earthed plug" ("Schuko plug") type and has a body 1, which can be manufactured by means of injection-moulding from synthetic material and serves to accommodate the other components of the mains plug. These components include a carrier 2 consisting of electrically insulating synthetic material, in which two contact pins 3 being parallel to each other are plugged. At the rear end of each contact pin 3 is attached an electrical conductor 4 leading the mains current. In addition, two protective contacts 5 are attached to the carrier 2, as is usual in the case of a two-pin earthed plug, which contacts are connected to a protective conductor 24. On the side of the carrier 2 facing the inside of the body 1, the carrier 2 is formed to comprise two mounts 6, which are arranged between the contact pins 3 parallel to these. They are each used for receiving one thermal bimetallic switch 7, whose switchgear is arranged in a housing, which can be a deep-drawn part made of sheet metal or a moulded part made of ceramic or synthetic material. Two connection wires 8 each lead out of the housing of the thermal bimetallic switch 7. The thermal bimetallic switches 7 are pushed into the mounts 6, wherein the connection wires 8 project upwardly (based on the representation in FIG. 1) from the mount 6. The mounts 6 are arranged in such a way that they have as small a distance as possible from the closest contact pin 3 to achieve the best possible heat transfer from this to the adjacent thermal bimetallic switch 7. In addition, for this purpose, an opening 9 can be provided in the respective adjacent contact pin 3 facing the respective mount 6.

The in total four connection wires 8 of the two thermal bimetallic switches 7 are connected to four electrical signal lines 10, of which, for reasons of clarity, only two signal lines 10 are shown and which are compiled together with the electrical conductors 4 carrying the mains power and with the protective conductor 24 to form a common cable 11.

To facilitate the installation and connection of the thermal bimetallic switches 7, their connection wires 8 are stuck in holes of a small circuit board 12 and are soldered with conductor paths on it. The holes in the circuit board 12 and the conductor paths on the circuit board are not shown in FIG. 1. The two thermal bimetallic switches 7 and the circuit board 12 form a module that is comfortable to handle, which can be prefabricated and pushed with its thermal bimetallic switches 7 into the mounts 6 as a module. Thereafter, the signal lines 10 can be soldered to the connection wires 8 projecting out of the circuit board 12 or to the conductor paths formed on the circuit board 12, which lead to the connection wires 8; the conductors 4 can be connected to the contact pins 3 and the protective conductor 24 can be connected to the protective contacts 5.

Figure 2:
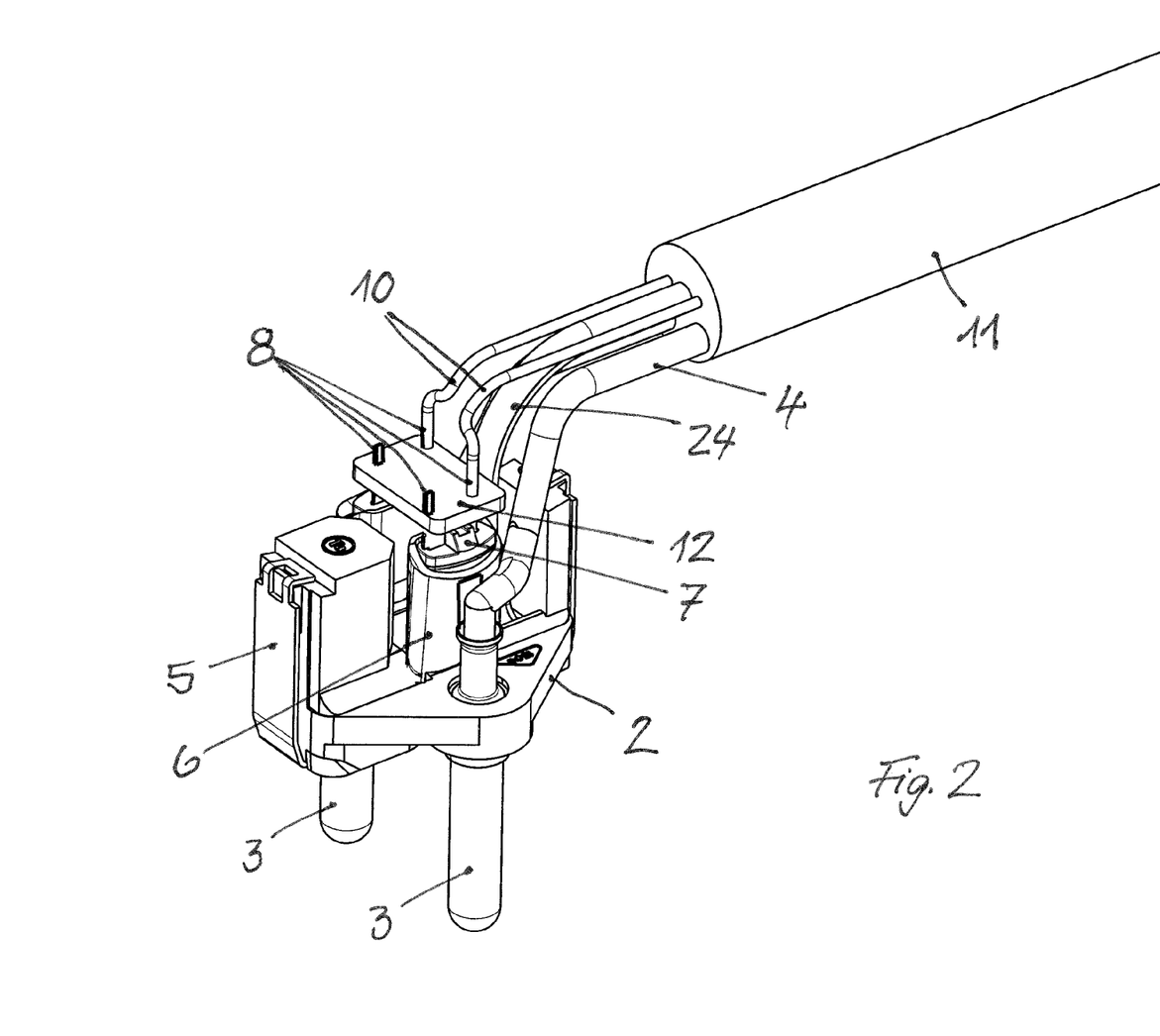
FIG. 2 shows the inner construction of the mains plug from FIG. 1 in a diagonal view.

After connecting the cable 11 to the contact pins 3, to the protective contacts 5 and to the thermal bimetallic switches 7, a semi-finished assembly is available, which is shown in FIG. 2. In FIG. 2, the position of the holes left out in FIG. 1 is shown, through which the connection wires 8 of the thermal bimetallic switches 7 pass through. The semi-finished assembly is completed by a cover 16, which is attached to the carrier 2 and fastened to it by means of being snapped onto it; see FIG. 1. The assembly consisting of the carrier 2 and the other components of the mains plug attached to it, including the thermal bimetallic switches 7, the circuit board 12, the cover 16 as well as consisting of an end section of the connected cable 11 can be over-moulded with a synthetic material to form the body 1. In the resulting mains plug, the body 1 encloses the assembly. The contact pins 3 and the protective contacts emerge from the body 1 from a first, front side 13 of the body 1. On a second, rear side 13 of the body 1, a grommet 14 is formed, from which the cable 11 leads out.

Figure 1A:
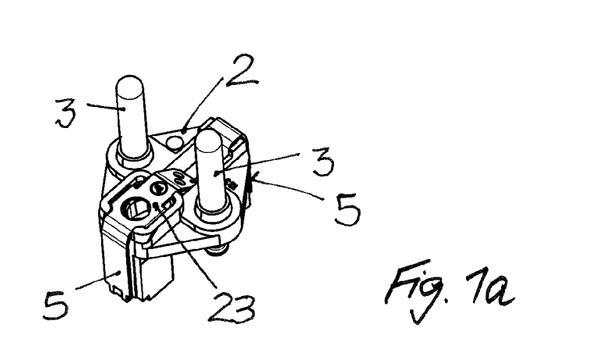
FIG. 1a shows a diagonal view of the outer side of the carrier in FIG. 1.

FIG. 1a shows a modified embodiment of the carrier 2 with the contact pins 3 and protective contacts 5 attached to it. In this case, the latter elements are connected to each other on the side pointing outwardly on the mains plug via a conductive bridge 23.

The exemplary embodiment shown in FIGS. 3 and 4 differs from the exemplary embodiment shown in FIGS. 1 and 2 in that the mounts 6 for the thermal bimetallic switches 7 are not formed on the carrier 2 but on the cover 16. The thermal bimetallic switches 7 are therefore first attached to the cover 16 and then together to the carrier 2, or are pushed into the mounts 6 after the cover 16 being snapped onto the carrier 2. In this case, the circuit board 12 lies on the cover 16 and closes it towards the top. The mounts 6 for the thermal bimetallic switches 7 project from the top side of the cover 16 into the space between the carrier 2 and the cover 16, where, like in the first exemplary embodiment, they extend between the two contact pins 3 as close as possible to the respectively nearest contact pin 3.

The connection wires 8 of the thermal bimetallic switches 7 project upwards from the cover 16 and are connected, like in the first exemplary embodiment, to a circuit board 12, which is also located above the cover 16.

The assembly, consisting of the carrier 2 with the contact pins 3 and the protective contacts 5 as well as the cover 16 being snapped onto the carrier 2 with the thermal bimetallic switches 7 inserted into it and connected by means of a circuit board 12 can be prefabricated, connected to the cable 11 and then over-moulded with synthetic material to form the body 1. The end of the cable 11, which is facing away from the mains plug, can either be directly connected to an electrical device or provided with a device plug.

In the exemplary embodiments in FIGS. 1, 2, 3 and 4, for reasons of clarity, only two of the four signal lines 10 for the two thermal bimetallic switches 7 are shown.

Figure 6:
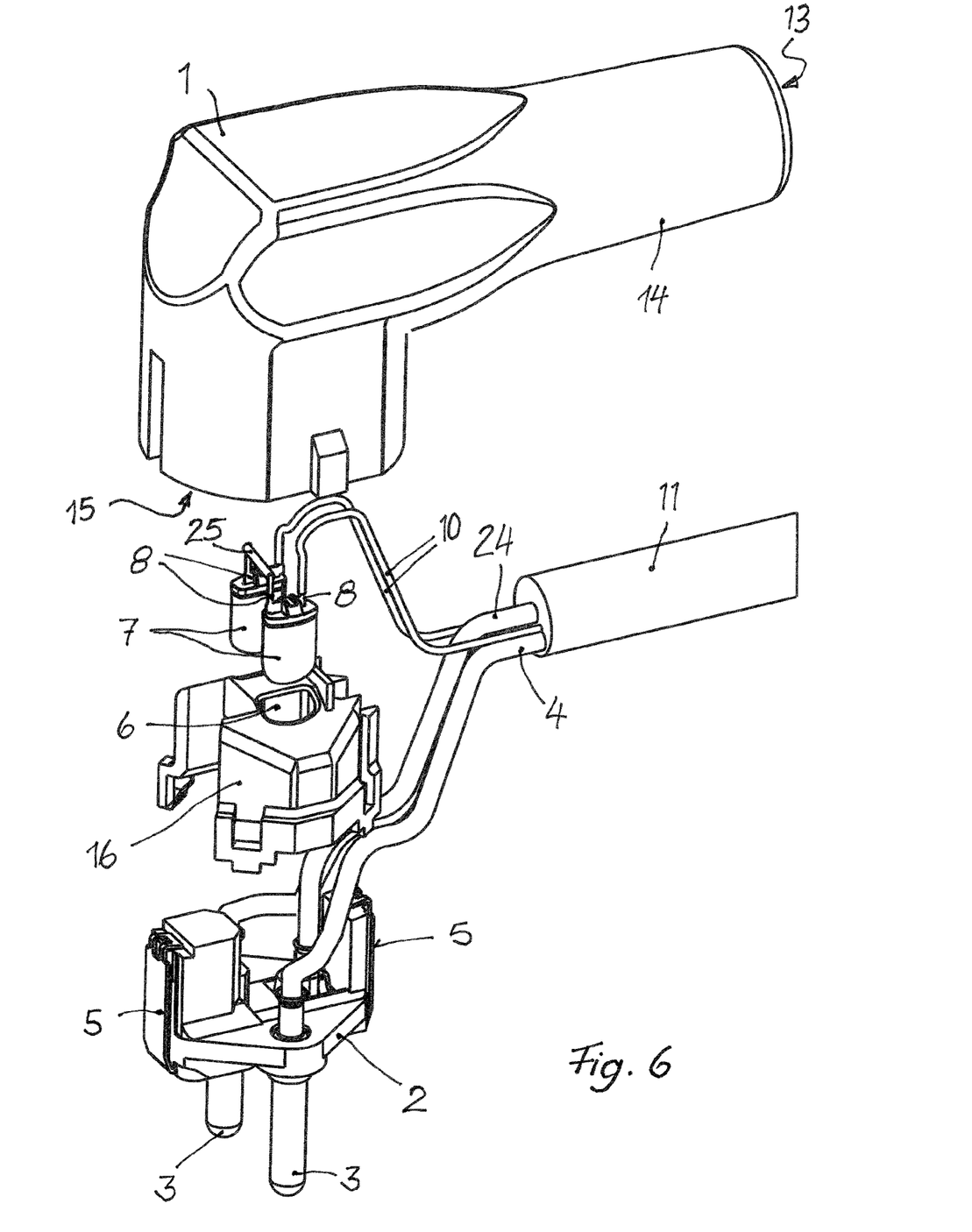
FIG. 6 shows a third exemplary embodiment of the mains plug according to the invention in an exploded view.

The exemplary embodiment shown in FIG. 6 differs from the embodiment shown in FIGS. 3 and 4 in that the circuit board 12 is dispensed with. Instead of four signal lines, only two signal lines 10 are provided, one of which is connected to a thermal bimetallic switch 7. The two thermal bimetallic switches 7 are electrically connected in series by a metallic bar 25. From this follows that, via the two signal lines 10, exceeding the switching temperature of the one thermal bimetallic switch or of the other thermal bimetallic switch of or both thermal bimetallic switches 7 can be reported, for example, by the fact that a low quiescent current flows through the signal lines when the thermal bimetallic switches 7 are closed below their switching temperature, and that when the switching temperature is exceeded, one or both thermal bimetallic switches 7 open and the quiescent current is interrupted.

The assembly, which is inserted into the body 1 or over-moulded with synthetic material to form the body 1, can be manufactured very efficiently. The mounts 6 for the thermal bimetallic switches 7 can be formed without an additional operation during moulding, in particular during injection-moulding of the insulating cover 16. The thermal bimetallic switches 7 can be inserted in the mounts 6 either before or after connecting the cover 16 to the carrier 2; they can be connected in an electrically conductive manner via the bar 25 before or after insertion into the mounts 6 so that the arrangement of the cover 16 and the connected thermal bimetallic switches 7 can be prefabricated and used as a module. Ultimately, the thermal bimetallic switches 7 located in the cover 16 can be connected to the signal lines 10 either before or after the application of the cover 16 to the carrier 2.

The mains plug according to the invention can therefore be flexibly assembled using different assembly methods.

Figure 5:
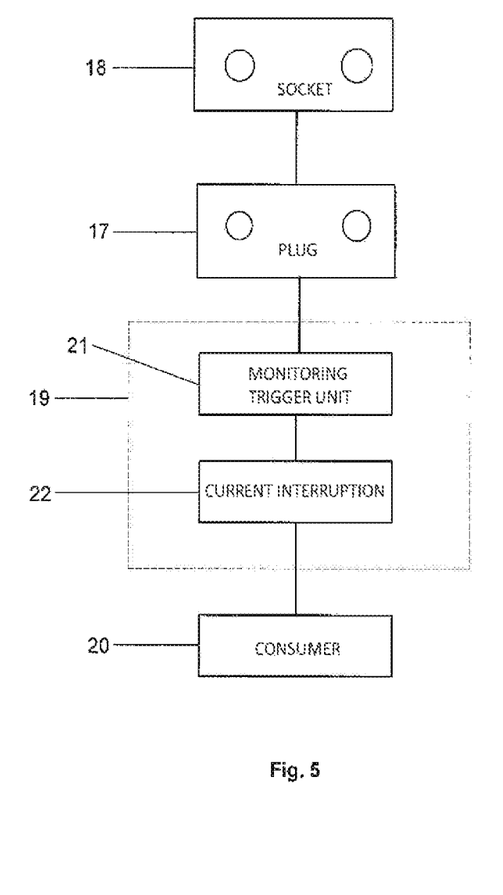
FIG. 5 is a block diagram to explain the basic procedure for monitoring the temperature in the mains plug and to ensure that there is no overheating in the mains plug and in the socket in which the mains plug is plugged.

A way to monitor the temperature in the mains plug can be explained based on the block diagram in FIG. 5. FIG. 5 schematically shows the mains plug 17, which is plugged into a mains power socket 18. From the mains plug, the cable 11 leads to an electrical device 19, from which the consumer is to be supplied with the mains power. In the example shown, it is upstream from a consumer 20. The device 19 contains a monitoring device 21, which applies a test voltage to the two thermal bimetallic switches 7. Assuming that the thermal bimetallic switches 7 are designed so that they are open below their switching temperature and are closed above the switching temperature, the monitoring device does not detect a current flow on the signal lines as long as the thermal bimetallic switches 7 are open because their temperature is below their switching temperature. However, if the temperature rises above their switching temperature, at least one thermal bimetallic switch closes, which the monitoring device detects by the current now flowing on the signal lines. Following this, the monitoring device 21 then triggers, for example, a current gate 22, which reduces or interrupts the electrical current flowing to the consumer 20 until the temperature of the thermal bimetallic switch(es) in the mains plug 17 again falls below its (their) switching temperature. In particular, the power supply of the consumer 20 is not completely switched off but is instead reduced until the temperature of the thermal bimetallic switch(es) 7 is again below its (their) switching temperature. The current gate 22 and the monitoring device 21 are therefore interconnected to form a control circuit.

LIST OF REFERENCE SIGNS 1 body
2 carrier
3 contact pins
4 conductor
5 protective contacts
6 mounts
7 thermal bimetallic switches
8 connection wires
9 opening in 6
10 signal lines
11 cable 12 circuit board
13 first side of 1
14 grommet
15 second side of 1
16 cover
17 mains plugs
18 mains plug socket
19 electrical device

The invention claimed is:

1. An electrical mains plug having a body formed from an electrically insulating material,
   two contact pins being arranged parallel to each other, each of which projects out of the body at a first side thereof,
   a sensor provided in association with said plug,
   said sensor being a temperature sensor having at least one thermal bimetallic switch, said at least one thermal bimetallic switch having a thermal bimetallic element,
   said sensor being associated with at least one of said two contact pins,
   further comprising a separate electrically insulating cover provided in said body,
   wherein said cover forms a mount for said at least one thermal bimetallic switch, and
   wherein said mount is open on its side opposite of said first side wherein said at least one thermal bimetallic switch is insertable from the opposite of said first side into said mount.

2. The mains plug according to claim 1, wherein said at least one thermal bimetallic switch is arranged next to at least one of said two contact pins.

3. The mains plug according to claim 1, further comprising two thermal bimetallic switches being provided in said body, wherein said cover forms a mount for each of said two thermal bimetallic switches.

4. The mains plug according to claim 3, wherein one of said two thermal bimetallic switches is closer to a first of said two contact pins than to a second of said two contact pins, and that the other of said two thermal bimetallic switches is closer to the second of said two contact pins than to the first of said two contact pins.

5. The mains plug according to claim 1, wherein each of said two contact pins has a connecting point, each of said connecting points is adapted for being connected to an electrical conductor leading out of a second side of said body, and each of said connecting points is covered by said cover.

6. The mains plug according to claim 1, wherein said mount projects from a first side of said cover into a space disposed opposite of said first side of said cover.

7. The mains plug according to claim 6, wherein said mount is open on a side facing said first side such that said at least one thermal bimetallic switch is pushed from said first side into said space.

8. The mains plug according to claim 6, wherein said at least one thermal bimetallic switch has connection wires that project out of said the cover towards said first side.

9. The mains plug according to claim 1, wherein said at least one thermal bimetallic switch has a metallic housing, which housing does not come into contact with the nearest of said two contact pins.

10. The mains plug according to claim 1, wherein said two contact pins are attached to a separate carrier comprised of electrically insulating material, said separate carrier being disposed in said body, and said cover being attached to said separate carrier.

11. The mains plug according to claim 1, wherein said mains plug has an electrical connection conductor cable attached to said mains plug, electrical conductors and extended signal lines extending inside said electrical connection conductor cable, said signal lines being connected to said at least one thermal bimetallic switch, each of said two contact pins being connected to one of said electrical conductors.

12. An electrical monitoring device for the mains plug according to claim 11, said monitoring device arranged and constructed to be connectable to an electrical connection conductor cable, wherein said electrical monitoring device is arranged and constructed to monitor whether said at least one thermal bimetallic switch is open or closed.

13. The electrical monitoring device according to claim 12, wherein said electrical monitoring device is arranged and constructed such that, after detecting a condition of said at least one thermal bimetallic switch after said at least one thermal bimetallic switch has exceeded a switching temperature, said electrical monitoring device temporarily reduces power consumption of the device.

14. The electrical monitoring device according to claim 13, further comprising a control circuit arranged and constructed such that after detecting the exceedance of a switching temperature of said at least one thermal bimetallic switch by said monitoring device, said control circuit is triggerable to reduce power consumption until none of said at least one thermal bimetallic switch is in a switching position which switching position would have otherwise existed upon exceeding said switching temperature.

15. The mains plug according to claim 3, wherein said two thermal bimetallic switches are arranged next to at least one of said two contact pins.

16. The mains plug according to claim 3, wherein said two thermal bimetallic switches are arranged between said two contact pins.

17. An electrical monitoring device for the mains plug according to claim 11, said electrical monitoring device arranged and constructed such that, after detecting a condition of said at least one thermal bimetallic switch after said at least one thermal bimetallic switch has exceeded a switching temperature, said electrical monitoring device temporarily interrupts the power consumption of the device.

18. The mains plug according to claim 5, wherein each of said connecting points is connected to an electrical conductor leading out of a second side of said body.

19. The mains plug according to claim 1, wherein said at least one thermal bimetallic switch is disposed in said cover.

20. An electrical mains plug having a body formed from an electrically insulating material,
   two contact pins being arranged parallel to each other, each of which projects out of the body at a first side thereof,
   a sensor provided inside of said plug,
   said sensor being a temperature sensor having at least one thermal bimetallic switch, said at least one thermal bimetallic switch having a housing and a thermal bimetallic element in said housing,
   said sensor being thermally associated with at least one of said two contact pins,
   a separate electrically insulating cover being provided inside the body of the plug,
   and at least one mount arranged in said cover and constructed to hold said at least one thermal bimetallic switch,
   wherein said mount has an opening to insert said at least one thermal bimetallic switch into said mount, and wherein said opening and said at least one thermal bimetallic switch are over-moulded with a synthetic material of the body.

21. An electrical mains plug having a body formed from an electrically insulating material,
   two contact pins being arranged parallel to each other, each of which projects out of the body at a first side thereof,
   a sensor provided inside of said plug,
   said sensor being a temperature sensor having two thermal bimetallic switches, each of said two thermal bimetallic switches having a thermal bimetallic element,
   wherein one of said two thermal bimetallic switches is closer to a first of said two contact pins than to a second of said two contact pins, and that the other of said two thermal bimetallic switches is closer to the second of said two contact pins than to the first of said two contact pins,
   wherein said mains plug has an electrical connection conductor cable attached to said mains plug, electrical conductors and two extended signal lines extending inside said electrical connection conductor cable, each of said two contact pins being connected to one of said electrical conductors,
   and wherein said two thermal bimetallic switches are electrically connected in series and each of said two signal lines being connected to one of said two thermal bimetallic switches.

22. An electrical mains plug having a body formed from an electrically insulating material,
   two contact pins being arranged parallel to each other, each of which projects out of the body at a first side thereof,
   a sensor provided inside of said plug,
   said sensor being a temperature sensor having at least one thermal bimetallic switch,
   said at !east one thermal bimetallic switch having a metallic housing and a thermal bimetallic element in said housing,
   a separate electrically insulating cover being provided inside the body of the plug,
   wherein said cover forms a mount holding said at least one thermal bimetallic switch in a position next to at least one of said two contact pins in such a way that said housing does not come into contact with said two contact pins.

\* \* \* \* \*

UNITED STATES PATENT AND TRADEMARK OFFICE
CERTIFICATE OF CORRECTION

| | |
|---|---|
| PATENT NO. | : 11,984,275 B2 |
| APPLICATION NO. | : 16/753752 |
| DATED | : May 14, 2024 |
| INVENTOR(S) | : Bruno Gengenbach and Michael Bucher |

It is certified that error appears in the above-identified patent and that said Letters Patent is hereby corrected as shown below:

In the Claims

Column 9, Claim 8, Line 58, "the cover" should read --cover--.

Column 10, Claim 13, Line 21, "the device" should read --a consumer electrical device connected to the electrical mains via the mains plug--.

Column 10, Claim 17, Line 43, "the device" should read --a consumer electrical device connected to the electrical mains via the mains plug--.

Column 10, Claim 18, Line 46, "leading out of a" should read --leading out of the--.

Column 12, Claim 22, Line 14, "!east" should read --least--.

Signed and Sealed this
Ninth Day of July, 2024

Katherine Kelly Vidal
*Director of the United States Patent and Trademark Office*